United States Patent [19]

Kawasaki et al.

[11] Patent Number: 4,565,269
[45] Date of Patent: Jan. 21, 1986

[54] HYDRAULICALLY OPERATED FRICTION CLUTCH

[75] Inventors: Hiroshi Kawasaki; Kazuoki Ukiana, both of Tokorozawa, Japan

[73] Assignee: Honda Giken Kogyo Kabushiki Kaisha, Tokyo, Japan

[21] Appl. No.: 579,823

[22] Filed: Feb. 13, 1984

[30] Foreign Application Priority Data

Feb. 15, 1983 [JP] Japan ............................ 58-20291[U]

[51] Int. Cl.$^4$ ...................... F16D 13/72; F16D 13/74; F16D 25/08
[52] U.S. Cl. ......................... 192/70.12; 192/85 CA; 192/91 A; 192/96; 192/113 B
[58] Field of Search .......... 192/91 A, 85 CA, 85 AA, 192/96, 70.12, 113 B

[56] References Cited

U.S. PATENT DOCUMENTS

| 2,089,472 | 8/1937 | Geyer | 192/85 CA |
| 4,118,151 | 10/1978 | Murakami et al. | 192/91 A |
| 4,287,977 | 9/1981 | Haga et al. | 192/91 A |

FOREIGN PATENT DOCUMENTS

| 1801543 | 6/1970 | Fed. Rep. of Germany | 192/91 A |
| 1401596 | 7/1975 | United Kingdom | 192/91 A |
| 1,478,980 | 7/1977 | United Kingdom | 192/91 A |

Primary Examiner—Alan Cohan
Assistant Examiner—John A. Rivell
Attorney, Agent, or Firm—Armstrong, Nikaido, Marmelstein & Kubovcik

[57] ABSTRACT

A hydraulically operated friction clutch suitable for use in motorcycle. The clutch has driving and driven friction discs axially slidably mounted on a clutch outer and a clutch inner, respectively. These friction discs are adapted to be pressed onto a pressure receiving plate by a pressing plate to make friction driving engagement between the clutch outer and the clutch inner. An annular carrier integrated with the pressing plate is disposed at the opposite side of the clutch inner to the pressing plate. A pressure receiving member is mounted on the center of the carrier through a release bearing adjacent to the end of a driven shaft connected to the clutch inner. The pressure receiving member has a cylindrical form closed at its one end and provided at its open end with a flange which is retained by the inner race of the release bearing. The pressure receiving member is coaxially and axially movably received in a bore formed in the driven shaft.

1 Claim, 3 Drawing Figures

HYDRAULICALLY OPERATED FRICTION CLUTCH

BACKGROUND OF THE INVENTION

The present invention relates to a hydraulically operated friction clutch of the type having a driving friction discs slidably mounted on a clutch outer, a plurality of driven friction discs slidingly mounted on a clutch inner connected to a driven shaft, the driving friction discs and the driven friction discs being interlaced alternatingly with one another, a pressure receiving plate integral with the clutch inner and disposed adjacent to one end of the train of the friction discs, a pressing plate disposed adjacent to the other end of the train of friction discs rotatably and axially movably as a unit with the clutch inner, the pressing plate being adapted to cooperate with the pressure receiving plate in pressing the driving and driven friction discs into friction engagement, an annular carrier integrated with the pressing plate and disposed at the opposite side of the clutch inner to the pressing plate, a pressure receiving member disposed on the center of the carrier through a release bearing adjacent to the end of the driven shaft, and a hydraulic cylinder disposed at the opposite side of the pressure receiving member to the driven shaft and adapted for axially driving a push rod contacting the pressure receiving member.

A hydraulically operated friction clutch of the type mentioned above is known. This known clutch, however, suffers from the following problems. Namely, it is often experienced that the pressing force acting on the push rod is inclined or deviated from the direction of the axis of the push rod, so that an abnormal force is applied to the release bearing and also to a sealing member on the sliding surface of the piston in the hydraulic cylinder. This undesirably impairs the smooth switching operation of the clutch.

SUMMARY OF THE INVENTION

Accordingly, an object of the invention is to provide a hydraulically operated friction clutch improved to prevent the inclination of the pressing force on the push rod from the axial line to protect the release bearing and the sealing member on the sliding surface of the piston in the hydraulic cylinder against any abnormal force, thereby to enhance the durability of the sealing member and to ensure smooth and safe switching operation of the hydraulically operated friction clutch.

To this end, according to the invention, there is provided a hydraulically operated friction clutch having a plurality of driving friction discs slidably mounted on a clutch outer, a plurality of driven friction discs slidingly mounted on a clutch inner connected to a driven shaft, the driving friction discs and the driven friction discs being arranged alternatingly, a pressure receiving plate integral with the clutch inner and disposed adjacent to one end of the train of the friction discs, a pressing plate disposed adjacent to the other end of the train of friction discs rotatably and axially movably as a unit with the clutch inner, the pressing plate being adapted to cooperate with the pressure receiving plate in pressing the driving and driven friction discs into friction engagement, an annular carrier integrated with the pressing plate and disposed at the opposite side of the clutch inner to the pressing plate, a pressure receiving member disposed on the center of the carrier through a release bearing adjacent to the end of the driven shaft, and a hydraulic cylinder disposed at the opposite side of the pressure receiving member to the driven shaft and adapted for axially driving a push rod contacting the pressure receiving member, wherein the improvement comprises that the pressure receiving member has a cylindrical form closed at its one end and provided at its open end with a flange which is retained by the inner race of the release bearing, and is received coaxially and axially movably in a bore formed in the driven shaft.

The above and other objects, features and advantages of the invention will become clear from the following description of the preferred embodiment taken in conjunction with the accompanying drawings.

BRIEF DESCRIPTION OF THE DRAWINGS

The accompanying drawings in combination show a preferred embodiment of the invention in which.

DESCRIPTION OF THE PREFERRED EMBODIMENT

A description will be made hereinunder as to an embodiment of the invention applied to a motorcycle, with specific reference to the accompanying drawings.

Figure 1:
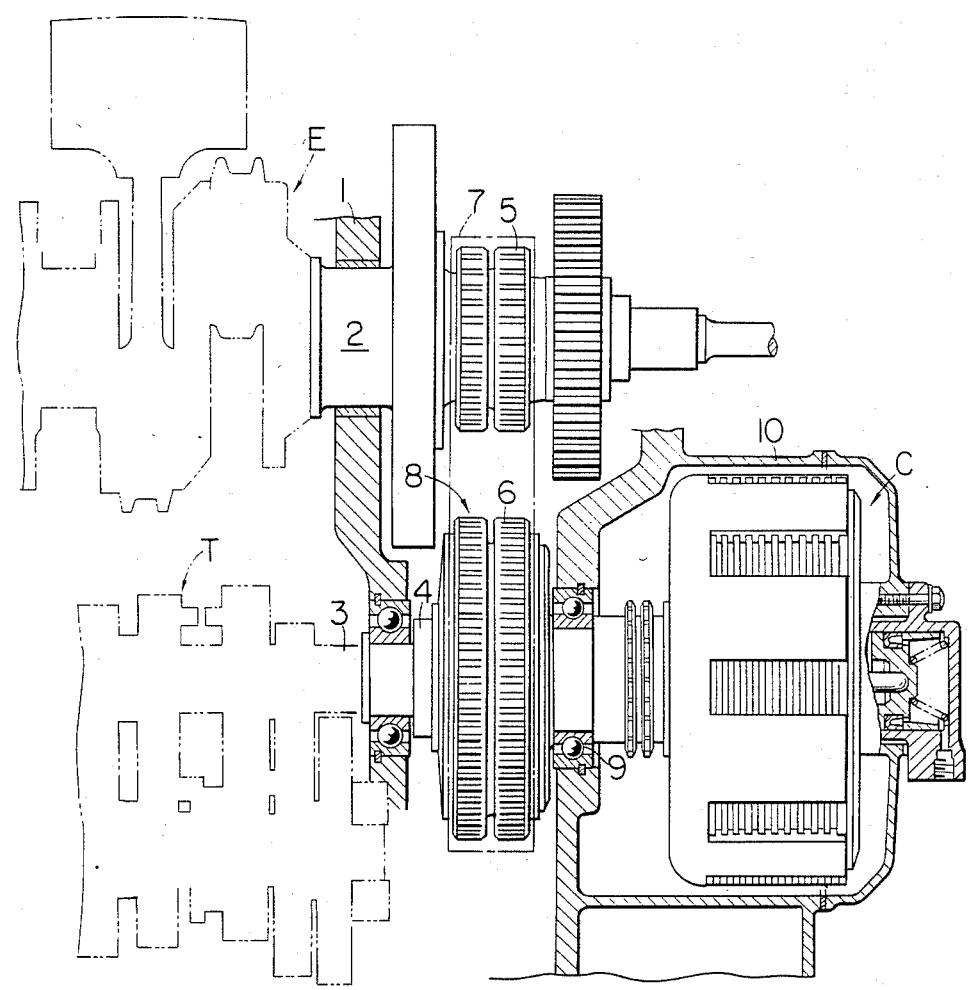
FIG. 1 is a vertical sectional plan view of an essential part of the transmission system of a motorcycle.

Referring first to FIG. 1, an engine E has a crank case 1 which rotatably carries the crank shaft 2 and the main shaft 3 of a transmission T. A cylindrical drive shaft 4 rotatably fits around the main shaft 3. The crankshaft 2 and the drive shaft 4 are drivingly connected to each other through a primary reduction gear 8 which is composed of a driving sprocket 5 fixed to the crankshaft 2, driven sprocket 6 fixed to the drive shaft 4 and a silent chain 7 going round these sprockets 5 and 6. The main shaft 3 is adapted to be selectively connected to the drive shaft 4 through a hydraulically operated friction clutch C in accordance with the invention. Therefore, when the friction clutch C is in the "on" condition, the power of the engine E is transmitted from the crankshaft 2 through the primary reduction gear 8 to the drive shaft 4 and then to the rear wheel of the motorcycle through the friction clutch C, gear train of the selected speed stage of the transmission T and a transmission means which is not shown.

Figure 2:
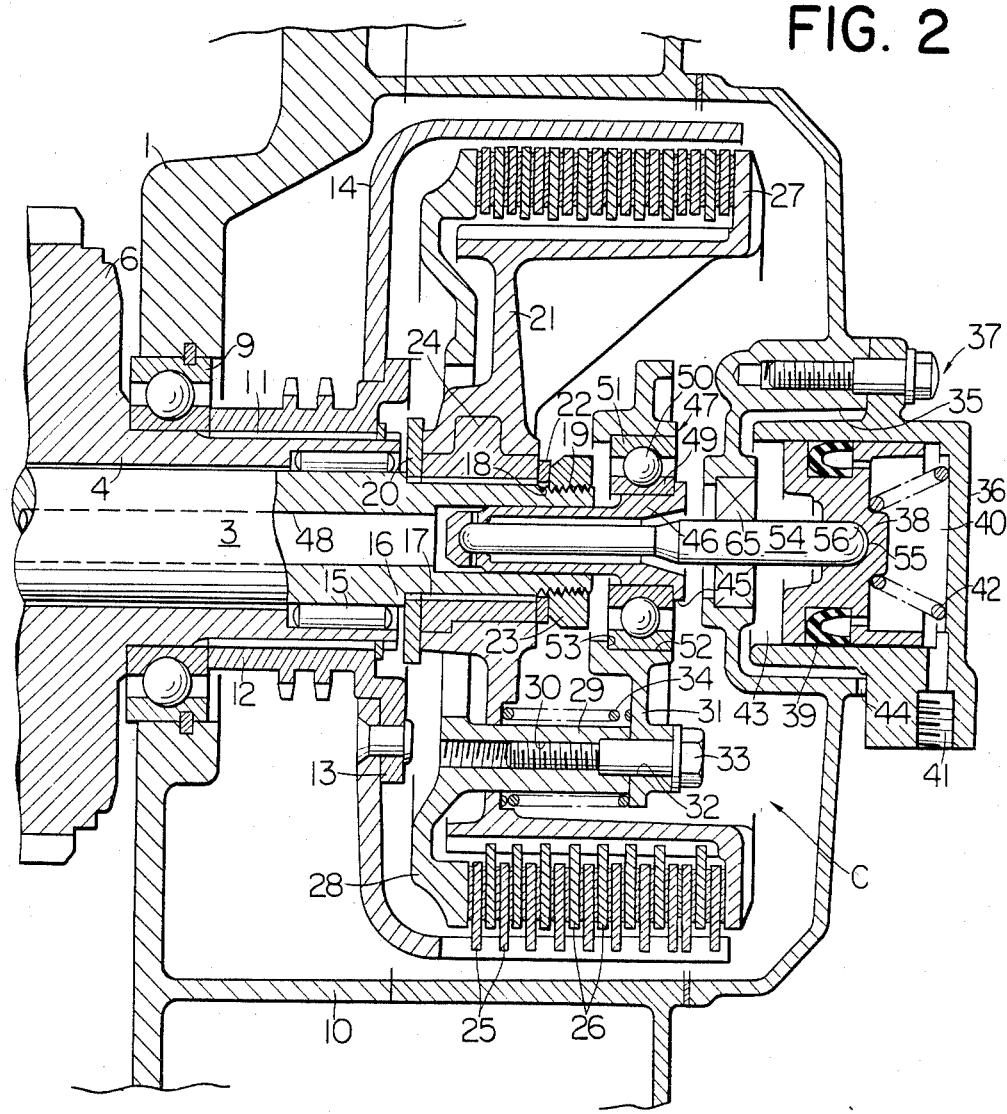
FIG. 2 is an enlarged vertical sectional view of a friction clutch.

Referring now to FIG. 2, the drive shaft 4 is supported by a bearing 9 and is extended further to project into a clutch casing 10. A spline 11 is formed on the periphery of the end portion of the drive shaft 4 projected into the clutch casing 10. A cylindrical member 12 is splined to this spline 11 on the drive shaft 4. The cylindrical member 12 is provided at its end with a flange portion 13 to which is fixed a clutch outer 14. The clutch outer 14, therefore, rotates as a unit with the drive shaft 4.

The main shaft 3 is supported rotatably by the inner peripheral surface of the drive shaft 4 with a bearing 15 interposed therebetween, and is projected deeper into the clutch casing 10 beyond the end of the drive shaft 4. The portion of the main shaft 3 projecting beyond the end of the drive shaft 4 is stepped as at 16 to present a tubular portion of a reduced diameter, on the other peripheral surface of which is formed a spline 17. This tubular portion is further stepped as at 18 to provide a tubular portion of a further reduced diameter on which is formed a male screw thread 19. A clutch inner 21 is splined to the spline 17 mentioned above. The clutch inner 21 is provided with a stopper plate 20 which abuts the step 16 of the main shaft 3. A nut 23 is screwed to the screw thread 19 on the main shaft 3, so as to press a washer 22 against the step 18. With this arrangement, the clutch inner 21 is allowed to rotate together with the main shaft 3 without coming off from the main shaft 3. Thus, the main shaft 3 functions as the driven shaft in the friction clutch C.

The main shaft 3 serves also as an input shaft for the transmission T. In order to absorb the shock which is caused during the shifting operation of the transmission T with the friction clutch C being in "off" state, it is necessary to minimize the inertia of the main shaft 3. From this point of view, it is advisable to use aluminum as the material of the clutch inner 21 which rotates as a unit with the main shaft 3, to reduce the weight as much as possible, although the portion 24 of the clutch inner 21, at which the clutch inner 21 engages with the spline 17, is preferably made by casting from cast iron because this portion requires a considerable strength. By so doing, it is possible to reduce the inertia of the main shaft 3 and, hence, to reduce the impact at the time of shifting operation of the transmission T. As in the case of the conventional arrangement, the clutch outer 14 is made from cast iron.

A plurality of drive friction discs 25 slidably splined to the clutch outer 14 and a plurality of driven friction discs 26 slidably splined to the clutch inner 21 are interlaced alternatingly with one another in the axial direction between the clutch outer 14 and the clutch inner 21. A pressure-receiving plate 27 integral with the clutch inner 21 is disposed at one end (right end as viewed in FIG. 2) of the stack of the friction discs. An annular pressing plate 28 for pressing the friction discs 25 and 26 onto the pressure-receiving plate 27 is disposed adjacent to the other end of the stack of the friction discs rotatably and axially movably.

The pressing plate 28 has a plurality of cylindrical projections 29 which are spaced in the circumferential direction. The cylindrical projections 29 axially movably penetrate the clutch inner 21. Female screw thread 30 is formed in the inner peripheral surface of each cylindrical projection 29. A generally ring-shaped carrier 31 contactable with the ends of the cylindrical projections 29 is disposed coaxially with the clutch inner 21 at the opposite side of the clutch inner 21 to the pressing plate 28. The carrier 31 has a plurality of holes 32 corresponding to the cylindrical projections 29. Bolts 33 are screwed to the female threads 30 in the cylindrical projections 29 through the holes 32. As a result, the pressing disc 28 and the carrier 31 are materially integrated with each other.

Coiled clutch springs 34 are disposed between the clutch inner 21 and the carrier 31 so as to surround respective cylindrical projections 29. The carrier 31 is biased away from the clutch inner 21 by the force of the clutch springs 34. Consequently, the pressing disc 28 is urged by the force of the clutch springs 34 towards the clutch inner 21, thereby to press the driving and driven friction discs 25 and 26 onto the pressure-receiving plate 27 to turn the clutch into the "on" state. In this state, the power transmitted from the crankshaft 2 to the clutch outer 14 through the primary reduction gear 8 and the drive shaft 4 is transmitted further to the clutch inner 21 through the friction discs 25 and 26 which are in the frictional driving engagement. The power is then transmitted to the transmission T through the main shaft 3.

The clutch casing 10 has an inward recess at its end on the extension of the axis of the main shaft 3. A generally cylindrical cylinder 36 closed at its one end is received by this recess 35 with its opened end directed inwardly. The cylinder 36 is fixed to the clutch casing 10 so as to constitute a hydraulic cylinder 37. Namely, a piston 38 is received slidingly in the cylinder 36 through the medium of a sealing member 39, and a hydraulic chamber 40 is formed between the piston 38 and the bottom of the cylinder 36. An oil feed port 41 for feeding a pressurized oil is formed in the wall of the cylinder 36 so as to communicate with the hydraulic chamber 40. A master cylinder (not shown) is connected to the oil feed port 41. On the other hand, a reset spring 42 housed in the hydraulic chamber 40 is adapted to bias the piston 38 away from the bottom of the cylinder 36. The force of the reset spring 42, however, is much smaller than that produced by the clutch springs 34. An atmospheric chamber 43 formed between the bottom of the recess 35 and the piston 38 communicates with the atmosphere through the annular gap between the inner peripheral surface of the recess 35 and the outer peripheral surface of the cylinder 36 and then through a vent hole 44 formed in the clutch casing 10.

A bottomed tubular pressure-receiving member 46 having a flange 45 on the open end thereof is mounted on the center of the carrier 31 through a release bearing 47 adjacent to the end of the main shaft 3. The pressure-receiving member 46 has its open end disposed adjacent to the hydraulic cylinder 37 and is extended over a considerable length in the direction opposite to the hydraulic cylinder 37 so as to be slidably received by a lubricating oil supply bore 48 formed coaxially in the main shaft 3 over the entire length of the latter.

An inner race 49 of the release bearing 47 is mounted on the periphery of the pressure-receiving member 46 adjacent to the open end of the latter. In addition, the flange 45 is retained by the end surface of the inner race 49 adjacent to the hydraulic cylinder 37. An outer race 51 constituting a part of the release bearing 47 is mounted in the central bore 52 of the carrier 31 so as to face the inner race 49 with balls 50 interposed therebetween.

A stop surface 53 facing the hydraulic cylinder 37 is formed on an intermediate portion of the central bore 52. This stop surface 53 abuts the end surface of the outer race 51 opposite to the hydraulic cylinder 37. Thus, the pressure-receiving member 46 is rotatably carried by the carrier for rotation relative to the latter so as to be moved in the axial direction together with the carrier 31 and the pressing disc 28.

A push rod 54 extends through a central hole in the bottom of the recess 35, with a sealing member 65 interposed between the wall of the central hole and the push rod 54. A hemispherical abutment surface 55 is formed on one end of the push rod 54. A hole 56 for fittingly receiving the above-mentioned one end of the push rod 54 is formed in the surface of the piston 38 confronting the atmospheric chamber 43. The bottom of the hole 56 is curved in conformity with the abutment surface 55. The abutment surface 55 is always held in contact with the bottom of the hole 56 by the force of the reset spring 42.

Figure 3:
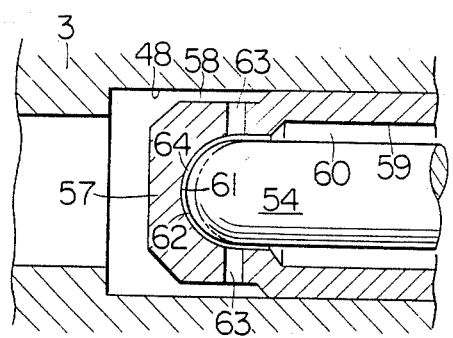
FIG. 3 is an enlarged sectional view of a portion of a pressure receiving member shown in FIG. 2 around the bottom of the same.

Referring now to FIG. 3, the bottom portion 57 of the pressure-receiving member 46 has a reduced diameter to leave a slight gap between itself and the inner surface of the lubricating oil feed port 48. A hole 59 is formed in the pressure-receiving member 46 so as to open to the hydraulic cylinder 37 through the above-mentioned open end of the member 46. This hole 59 has such an inside diameter as to leave a gap between itself and the outer surface of the push rod 54. This gap constitutes an annular flow passage 60. The bottom surface 61 of the hole is curved substantially in conformity with a hemispherical abutment surface 62 formed on the other end of the push rod 54 so as to fittingly receive the latter. Plural communication holes 63 formed in the bottom 57 each have one end opening to the annular passage 58 and the other end opening to the bottom surface 61 mentioned before. Therefore, the pressure of lubricating oil acting on the lubricating oil feed port 48 acts between the bottom surface 61 and the abutment surface 62 of the push rod 54 through the annular gap 58 and the communication holes 63. Consequently, a minute gap 64 is formed between the abutment surface 62 and the bottom surface 61 in accordance with the pressing force of the pressing rod 54, i.e. the pressing force of the hydraulic cylinder 37, and the force produced by the pressure of the lubricating oil. The lubricating oil, therefore, is supplied into the clutch casing 10 through this minute gap 64 and the annular passage 60. Consequently, the driving friction discs 25 and the driven friction discs 26 are effectively cooled by the lubricating oil.

When an excessive amount of lubricating oil is supplied to the friction discs 25 and 26 in the "off" state of the clutch, a phenomenon referred to as "dragging" takes place to cause a tendency of driving of the driven friction discs 26 by the driving friction discs 25 due to the viscosity of the lubricating oil. To obviate this problem, the communication holes 63 are formed in the bottom 57 at such a position that the minute gap 64 between the communication holes 63 and the annular passage 60 provides the greatest resistance to the oil flowing therethrough when the clutch is in the "off" state, i.e. when the hydraulic chamber 40 is supplied with the pressurized oil to position the abutment surface 62 of the push rod 54 in the close proximity of the bottom surface 61 as shown by real line in FIG. 3 to reduce the minute gap 64 as compared with the case of "on" state of the clutch shown by two-dot-and-dash line in the Figure. With this arrangement, it is possible to reduce the rate of supply of the lubricating oil to the friction discs 25 and 26 in the "off" state of the clutch, thereby to prevent the unfavourable dragging between the frictions discs 25 and 26.

The operation of this embodiment will be described hereinunder.

When the pressurized oil is not supplied to the hydraulic chamber 40 in the hydraulic cylinder 37, the carrier 31 and the pressing plate 28 have been displaced towards the hydraulic cylinder 37 by the force of the clutch springs 34, so that the friction discs 25 and 26 are in friction engagement with each other to allow the transmission of the power, which is delivered to the friction clutch C from the drive shaft 4, to the transmission T via the main shaft 3.

Then, as the pressurized oil is supplied to the hydraulic chamber 40 from the master cylinder as a result of manipulation of the clutch lever (not shown), the piston 38 is slided to the left side as viewed in FIG. 2 against the force of the clutch springs 34 so that the push rod 54 pushes, through the pressure-receiving member 46 and the release bearing 47, the carrier 31 and the pressing disc 28 to the left side as viewed in FIG. 2. Consequently, the friction discs 25 and 26 are disengaged from each other to suspend the transmission of power from the clutch outer 14 to the clutch inner 21. Namely, the clutch is turned into the "off" state.

The pressure-receiving member 46 carried by the carrier 31 through the release bearing 47 extends to the opposite side of the piston 38. The push rod 54, contacting at its one end with the piston 38, substantially contacts at its other end with the bottom surface 61 of the pressure receiving member 46 disposed at the opposite side of the release bearing 47 to the piston 38. Therefore, if the direction of force exerted by the piston 38 on the push rod 54 is inclined for any reason, the pressure receiving member 46 is slightly inclined to make its axis coincide with the direction of the force and does not make any further inclination. Consequently, the pressing force is prevented from being inclined unlimitedly with respect to the direction of the axis, thereby to protect the release bearing 47 from excessive force and to avoid application of abnormal force to the sealing member 39 on the side surface of the piston 38 which may, for otherwise, be caused by the inclination of the force direction to impair the sealing function of the sealing member 39.

This in turn ensures a smooth movement of the piston 38 and the push rod 54 and, hence, a smooth and safe switching of the clutch from "on" to "off" states and vice versa.

As will be understood from the foregoing description, the clutch of the invention has a pressure receiving member which is provided at its open end with a flange which retained by the inner race of the release bearing and is received coaxially and axially slidably by the bore formed in the driven shaft. Therefore, when the direction of pressing force applied to the push rod is inclined slightly from the direction of the axis, the pressure receiving member is inclined slightly until its axis comes to coincide with the direction of the force to effectively guide the push rod, but is never inclined any more. This arrangement effectively prevents the offset or inclination of the direction of the force from the axial direction unlimitedly. Consequently, the release bearing is protected from excessively large force and the application of abnormal force to the sealing member on the sliding surface of the piston in the hydraulic cylinder is avoided.

In consequence, the movement of the push rod is smoothed to ensure a smooth and safe switching operation of the clutch and the release bearing and the sealing member are allowed to stand longer use. Furthermore, since the driven shaft is made hollow to permit the release bearing to sufficiently approach the driven shaft, the size of the friction clutch as a whole is never increased substantially even when a long pressure receiving member is used.

What is claimed is:

1. A friction clutch assembly operating in an oil bath comprising:
   (a) an outer clutch member having a cylinder open at one end, partially closed at the other end and connectable at the partially closed end to a first tubular shaft;
   (b) an inner cylindrical clutch member having a pressure receiving surface at one end thereof and being partially closed at the opposite end so as to engage a second tubular shaft concentric with and carried within said first shaft;
(c) a first friction means engaged with the inner surface of said outer member;
(d) a second friction means engaged with the outer surface of said inner member, and contactable with said first friction means;
(e) a pressure plate carried on said inner member and rotating axially with said inner member, having a pressing plate surface disposed at the end of said friction means opposite to the pressure receiving portion of said inner member;
(f) a plurality of springs engaging said inner member and said pressure plate so as to cause said pressure plate to be held against said friction means;
(g) a thrust bearing having an inner and an outer race, said outer race engaging a portion of said pressure plate;
(h) a pressure receiving member comprising a main body portion, a closed end portion projecting through said thrust bearing into a bore in said second shaft, and an open end portion for engagement in said inner race of said thrust bearing, wherein the inner surface of said closed end portion includes an hemispherical surface and the outer surface of said closed end portion has a diameter smaller than the diameter of said main body portion, said closed end portion including a plurality of passages extending therethrough;
(i) a push rod, having an end received into the hemispherical portion of said pressure receiving member, said push rod having an end formed into an hemisphere with a radius slightly smaller than that of the hemispherical portion of said pressure receiving member into which it is received, said push rod projecting through said open end of said pressure receiving member; and
(j) means for pushing said push rod against said pressure receiving means and engaging said push rod at the end opposite to that where said push rod engages said pressure receiving means, wherein lubricating oil delivered through the center of said second tubular shaft passes through the space between said pressure receiving member and said bore in said second shaft, and further passes through said passages in said pressure-receiving member to provide an oil cushion between the end of said push rod and the hemispherical surface in said pressure-receiving member wherein the push rod is received.

* * * * *